United States Patent [19]

Ito et al.

[11] Patent Number: 4,831,418

[45] Date of Patent: May 16, 1989

[54] EXPOSURE CONTROL DEVICE OF COPYING MACHINE

[75] Inventors: Kouji Ito, Toyokawa; Kaoru Hashimoto, Toyohashi, both of Japan

[73] Assignee: Minolta Camera Kabushiki Kaisha, Osaka, Japan

[21] Appl. No.: 21,776

[22] Filed: Mar. 4, 1987

[30] Foreign Application Priority Data

Mar. 4, 1986 [JP] Japan .................................. 61-45273

[51] Int. Cl.[4] .............................................. G03B 27/72

[52] U.S. Cl. ...................................... 355/69; 355/214; 355/208

[58] Field of Search ................ 355/14 E, 14 R, 14 D, 355/67–69

[56] References Cited

U.S. PATENT DOCUMENTS

Re. 32,330 1/1987 Miyakawa et al. .......... 355/14 D X
4,320,964 3/1982 Ishida et al. .......................... 355/69
4,375,331 3/1983 Tohyama et al. ................ 355/67 X
4,657,377 4/1987 Takahashi ..................... 355/14 E X
4,711,569 12/1987 Nishimori et al. .................... 355/64

FOREIGN PATENT DOCUMENTS 54-36502 11/1979 Japan .
57-124374 8/1982 Japan .

*Primary Examiner*—L. T. Hix
*Assistant Examiner*—Rutledge D.
*Attorney, Agent, or Firm*—Price, Gess & Ubell

[57] ABSTRACT

An exposure control device of a copying machine is provided with a white member at an end portion of an original document holding surface of a platen so as to prevent adhesion of toners to a top end portion of the copying paper. While a scanning optical system moves from the scan start point to the border between the original document and the white member, sufficient light quantity to prevent fogging of the image of the white member is supplied by the exposure lamp. The light quantity of the exposure lamp is changed to a suitable value corresponding to the original document in response to a signal for detecting the border.

5 Claims, 10 Drawing Sheets

FIG. 4(a)

| EXPOSURE STEP | | 1 | 2 | 3 | 4 | 5 | 6 | 7 | 8 | 9 | AE LEVEL 1 | AE LEVEL 2 |
|---|---|---|---|---|---|---|---|---|---|---|---|---|
| LIGHT QUANTITY DATA | P1 | 0 | 1 | 0 | 1 | 0 | 1 | 0 | 1 | 0 | 0 | 1 |
| | P2 | 0 | 0 | 1 | 1 | 0 | 0 | 1 | 1 | 0 | 0 | 0 |
| | P3 | 0 | 0 | 0 | 0 | 1 | 1 | 1 | 1 | 0 | 0 | 0 |
| | P4 | 0 | 0 | 0 | 0 | 0 | 0 | 0 | 0 | 1 | 0 | 0 |
| | P5 | 1 | 1 | 1 | 1 | 1 | 1 | 1 | 1 | 1 | 0 | 0 |

FIG. 4(b)

| EXPOSURE STEP | 1 | 2 | 3 | 4 | 5 | 6 | 7 | 8 | 9 |
|---|---|---|---|---|---|---|---|---|---|
| VOLTAGE SUPPLIED TO THE EXPOSURE LAMP | 50 | 55,9 | 56,8 | 57,7 | 58,5 | 60,34 | 62,2 | 64,1 | 68,1 |

EXPOSURE CONTROL DEVICE OF COPYING MACHINE

BACKGROUND OF THE INVENTION

1. Field of the Invention

The present invention relates to exposure control devices used in copying machines, and more particularly to an exposure control device which can erase a foggy zone at the top or end portion of an image.

2. Description of the Prior Art

In an electrophotographic copying machine, an original document image is scanned optically and projected onto a photosensitive member to form an electrostatic latent image thereon, and the electrostatic latent image is developed by toners and the toner image is transferred on a copy sheet and then fixed by heat pressing.

In this case, a fixing device which heats and presses a toner image onto a paper by a heating roller is generally used as the fixing means. However, if there exists a toner image at top end portion of a copy sheet during fixing, some trouble will occur such that a conveying portion for the copy sheet is soiled, or toners adhere to a roller at the bottom side of the fixing device and soil the rear face of the copy sheet by adhering thereto, or the copy sheet sticks to the fixing roller and is rolled thereto.

In order to eliminate the trouble, in the prior art, as shown in FIG. 1(*a*), a white member W of definite width is provided on the top surface of an original document holding glass 3 corresponding to the scan start end of the original document by means of painting or printing, and an original document scale having a width shorter than that of the white member W is overlapped therewith. The top end of the original document OP to be held on the original document holder glass 3 is positioned to overlap with the white member W at portion which is not covered by the original document scale. When the scanning optical system scans the original document, the scan is started from the white member W whereby the top end portion of an electrostatic latent image of the original document formed on the photosensitive member is erased by length "a" so that a toner image is not formed on the top end portion of the copy sheet.

However, since light reflectance of the white member is determined by the material to be used or thickness of a material to constitute the white member, light reflectance in this part is not always coincide with that of the background of the original document. In usual material of the white member W, reflection light quantity when an illumination light is incident on the original document glass from the bottom surface and reflected by the material to appear at the glass bottom surface, is comparable with a reflection light quantity when an original document of slightly dark background having the reflection density of about 0.3 is held on the original document glass. Consequently, when the scanning is performed, the reflection light quantity being incident on the photosensitive member varies at the border between the white member and the top end of the original document, and fog may be produced at the top end portion of the electrostatic latent image to be erased.

Exposure control devices are roughly classified into a system to control the exposure by manual operation and a system where the exposure is controlled automatically by using a light receiving element to measure the light quantity reflected by the original document.

In a copying machine having not only the white member W but also the manual exposure control mechanism, if the exposure is set by the manual operation so that the original document of a usual white base density is suitably copied, the exposure value will become insufficient at the white member W and a foggy zone will be produced at the top end portion of the image to be formed.

On the other hand, also in the automatic exposure control mechanism particularly the real time automatic exposure control mechanism (hereinafter referred to as "real time AE system") a, similar foggy zone is produced. The real time AE system, as disclosed in Japanese Laid Open Patent Application No. 124374/82 for example, continuously changes the exposure value to a suitable value corresponding to the light quantity from a small portion of the original document subjected to the slit exposure, In a copying machine having the real time AE, when an exposure sensor (hereinafter referred to as "AE sensor") scans the white member W of the original document glass, the exposure value is corrected to a value corresponding to the reflection density 0.3 of this part and the control without fog is performed. When the AE sensor attains to the border between the white member W and the original document surface OP and the light quantity in this part is detected, if there is diffrence of the reflection light quantity between the white member W and the original document OP, the AE sensor outputs the light quantity detecting signal as shown in FIG. 1(*b*). In order to make the reflection light quantity constant, the AE system varies the light quantity of the exposure lamp as shown in FIG. 1(*c*). As a result, the reflection light quantity being incident on the photosensitive member surface extremely varies at the border between the white member W and the original document surface OP as shown in FIG. 1(*d*). In the original document of the white ground, since the light quantity is once decreased and then increases rapidly, as explained above the fog is produced.

SUMMARY OF THE INVENTION

Main object of the invention is to provide an exposure control device which can obtain suitable image throughout the whole area.

Another object of the invention is to provide an improved exposure control device wherein a foggy zone is not produced at the top end portion of the image.

Still another object of the invention is to provide an improved exposure control device for copying machines, wherein a white member is provided at one edge of an original document holding platen.

Foregoing and other objects are attained by an exposure control device used in a copying machine having a transparent platen to hold an original document thereon, a lamp to illuminate the original document, a scanning member to scan image of the original document, and a lens to project the scanned image, said exposure control device comprising:

(a) a white member provided on the transparent platen at upstream side in the scanning direction from the original document holding surface;

(b) means for setting the light quantity to form a suitable image;

(c) means for generating a signal at the timing for the scanning member to scan the border between the white member and the original document;

(d) means for controlling the electric power to be supplied to the lamp; and (e) said control means effecting the control so that predetermined electric power is supplied to the lamp while the scanning member moves from the scan start position to the border, and after the signal is generated the electric power is supplied to the lamp in response to the lamp light quantity setting means, wherein the predetermined electric power is sufficient for the image of the white member on the platen not to produce fog.

More specifically, the exposure setting means comprises a light receiving element arranged in the projection light path for outputting a signal corresponding to the received light quantity, and means for determining suitable light quantity of the lamp by comparison of the output of the light receiving element and a reference value, wherein before the signal is generated the first reference value is used so as to obtain larger light quantity of the lamp, and after the signal is generated the second reference value is used so as to perform the image reproduction corresponding to the original document.

BRIEF DESCRIPTION OF THE DRAWINGS

FIG. 4(*a*) and FIG. 4(*b*) are diagrams illustrating the relation between the exposure steps and the light quantity data and the relation between the exposure steps and the exposure lamp voltage;

FIG. 6 is a flow chart illustrating an outline of the whole processing;

FIG. 7 is flow chart illustrating an outline of the process control;

FIG. 8 is a flow chart of the paper feed control routine;

FIG. 9 is a flow chart of the photosensitive drum control routine;

FIG. 10 is a flow chart of the scanning optical system control routine; and

FIG. 11 is a flow chart of the exposure control routine.

DESCRIPTION OF PREFERRED EMBODIMENTS

Figure 2:
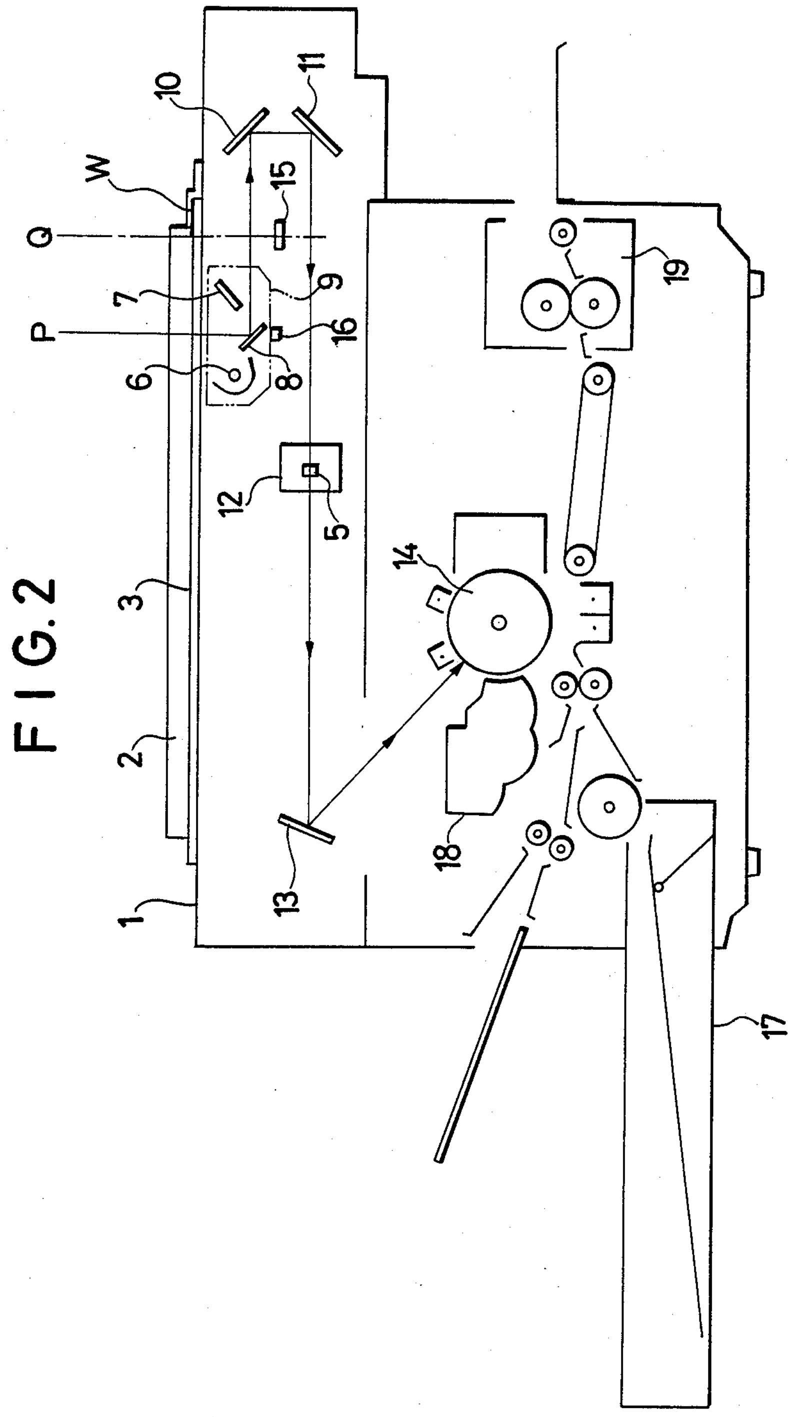
FIG. 2 is a lateral sectional view of a copying machine to which the exposure control device of the invention is applied.

An embodiment of the invention will now be described. FIG. 2 is a lateral sectional view of a copying machine adapted to effect an exposure control device of the invention.

In FIG. 2, numeral 1 designates a copying machine body, numeral 2 designates an original document cover, numeral 3 designates an original document holding glass to hold an original document thereon, and W designates a white member on the top surface of the original document holding glass. Numeral 6 designates an exposure lamp, and numeral 7 designates a book reflecting mirror which is a reflecting mirror to illuminate the original document from opposite direction with respect to the illuminating direction of the exposure lamp 6 so that any shade due to partial roughness such as an adhering portion is not produced on the original document. Numeral 8 designates a first mirror. The exposure lamp 6, the book reflecting mirror 7 and the first mirror 8 constitute a first slider 9.

Numerals 10 and 11 designate second and third mirrors, which constitute a second slider, numeral 12 designates a lens, numeral 13 designates a fourth mirror, and numeral 14 designates a photosensitive drum. The original document image is focused onto the photosensitive drum 14 by the optical system constituted by the above-mentioned mirrors and the lens.

Numeral 17 designates a paper feed cassette, numeral 18 designates a developing device, numeral 19 designates a fixing device, and numeral 5 designates an AE sensor for detecting the reflectance of the original document.

Figure 1:
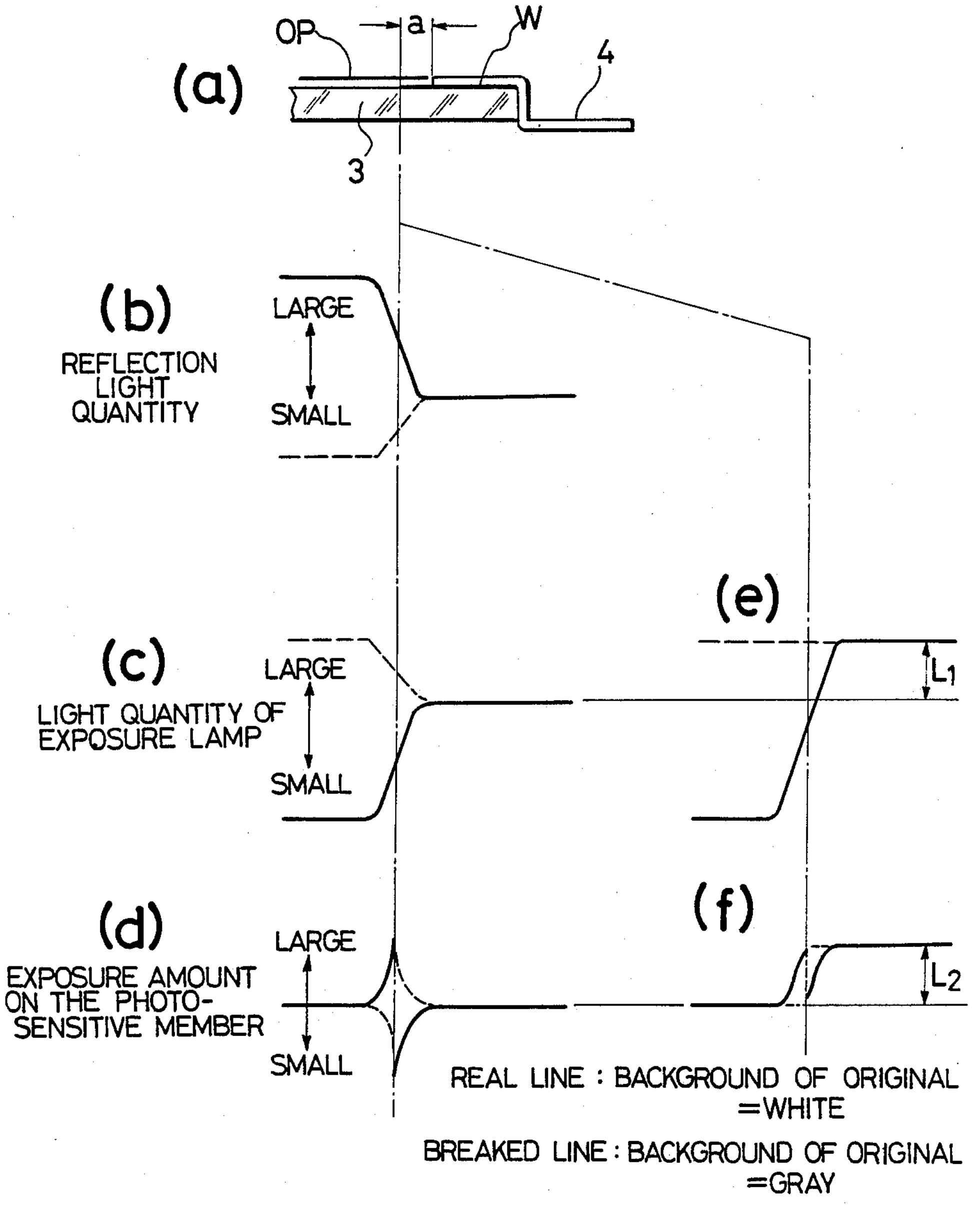
FIGS. 1(*a*) to (*f*) are diagrams showing variation of light quantity illustrating operation of an exposure control device of the invention.

As clearly seen referring to FIG. 1(*a*), on the original document holding glass 3 of the original document holder, a white member W of definite width is provided by means of painting or printing near the scan start end of the scanning optical system. When the original document OP is put on the original document holding glass, the top end of the original document is overlapped with the white member W by several millimeters. An exposure control switch 15, which is turned on at the arriving time of the scanning line P of the first slider 9 to the border Q between the white member W and the original document surface OP, is installed near the travelling path of the first slider 9 and operated by an actuating member 16 of the slider 9.

Figure 3:
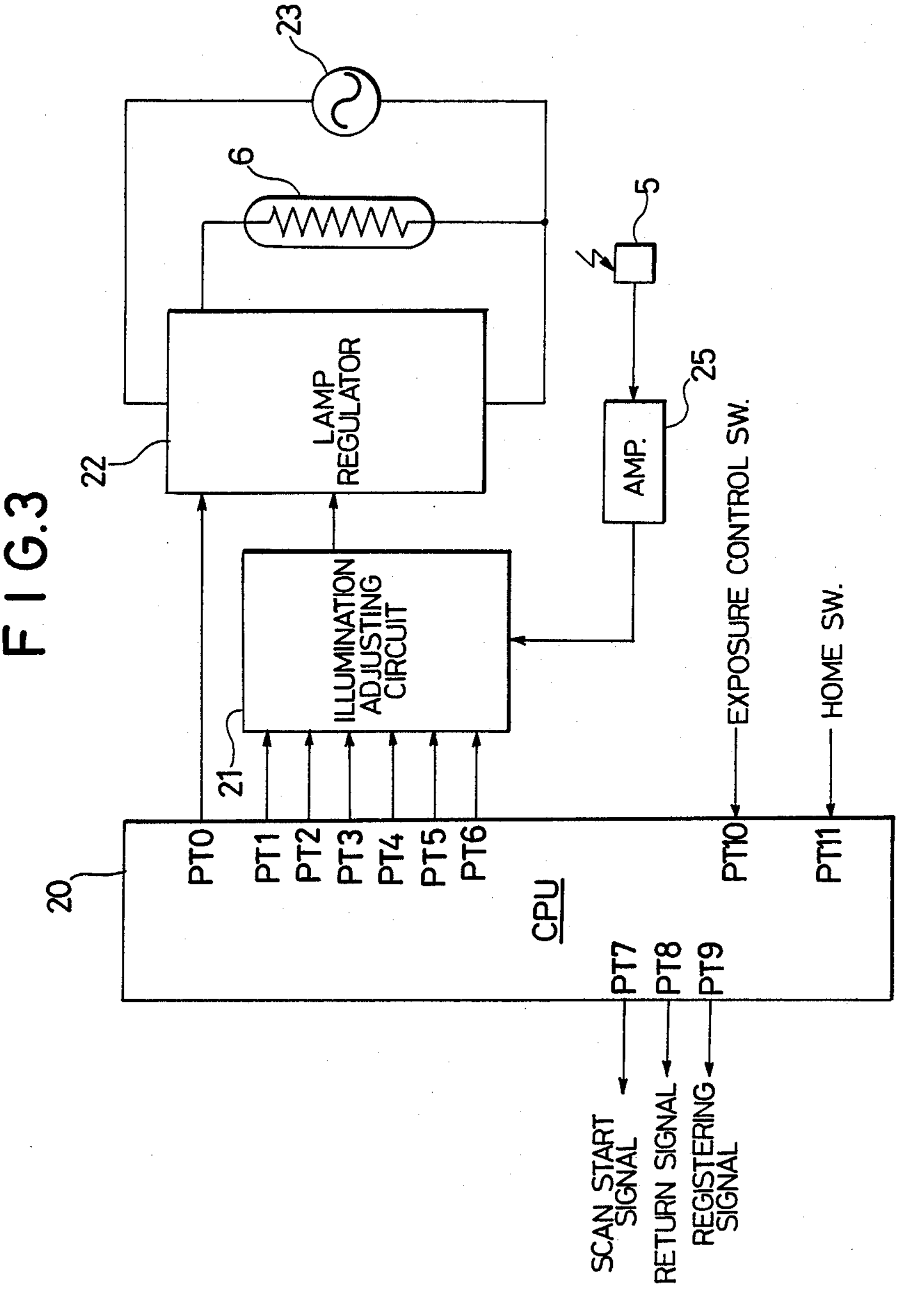
FIG. 3 is a block diagram of an exposure control circuit.

FIG. 3 is a block diagram of a control circuit for controlling the exposure. In FIG. 3, numeral 20 designates a controlling CPU, numeral 21 designates an illumination adjusting circuit, numeral 22 designates a lamp regulator, numeral 6 designates an exposure lamp, numeral 23 designates a power source, numeral 5 designates the above-mentioned AE sensor, and numeral 25 designates an amplifier.

An exposure lamp lighting signal is outputted from output port PT0 of the CPU 20. Changing signals of the manual exposure in which the exposure value is stepwisely varied by an operator (step exposure) and the automatic exposure control (AE) and the light quantity data regarding respective cases are outputted from output ports PT1 to PT6 of the CPU 20.

The CPU 20 performs not only the exposure control but also the sequence control of the copying machine. A scan start signal for the scanning optical system is outputted from output port PT7, and a return signal based on finishing of the scan is outputted from output port PT8. A registering signal for controlling the operation of a timing roll to move a copying paper to the transfer position is outputted from port PT9.

Further, an exposure control switch to be turned on at the time of the scan line of the first slider 9 of the scanning optical system attaining to the border between the white member of the original document holding glass and the original document surface OP is connected to input port PT10 of the CPU 20, and a home switch for detecting the start of scanning operation of the scanning optical system is connected to input port PT11.

Next, operation of the illumination adjusting circuit will be described.

The illumination adjusting circuit 21 outputs a signal to the lamp regulator 22 based on the light quantity data outputted from the CPU 20, and based on the signal the lamp regulator 22 controls voltage of the exposure lamp for adequate illumination adjustment.

In the case of the AE mode, brightness signal detected by the AE sensor 5 is fed back through the amplifier 25 to the illumination adjusting circuit 21 so as to compare with a reference level for determining a voltage to be supplied to the lamp 6 from lamp regulator 22.

The exposure control of the invention will be further described by referring to FIGS. 1(*a*), (*e*), (*f*).

While the scanning optical system scans the white member W according to the invention, the reference level of the AE control is set higher so that the light quantity for the exposure is increased by L1. After attaining to the position of scanning the original document surface OP, the reference level of the AE control is returned to the normal value. Variation of the light quantity of the exposure lamp in this case becomes as shown in FIG. 1(*e*), and the exposure value on the photosensitive member is increased by L2 and becomes as shown in FIG. 1(*f*) Consequently, even at the border between the white member W and the original document surface OP, insufficiency of the exposure value does not occurred and the fog is not produced.

In case of a manual setting of the exposure value, the exposure value is increased to the predetermined level 1 so that fog is not produced while the scanning optical system scans the white member W. After attaining to the position of scanning the original document, the exposure value is adapted to a value manually set by the operator.

FIG. 4(*a*) illustrates an example of the relation of the exposure step and the light quantity data outputted from the output ports P1 to PT5 of the CPU. In the case of the AE mode, signals of two levels, i.e., level 1 with the increased reference level and level 2 with the normal reference level, are outputted. The reference level means a level which can deal with the automatic exposure control to finish the background of the original document into white in a range corresponding to steps 1 to 9 in the case of the step exposure.

FIG. 4(*b*) shows an example of the exposure step and voltage supplied to the exposure lamp.

Figure 5:
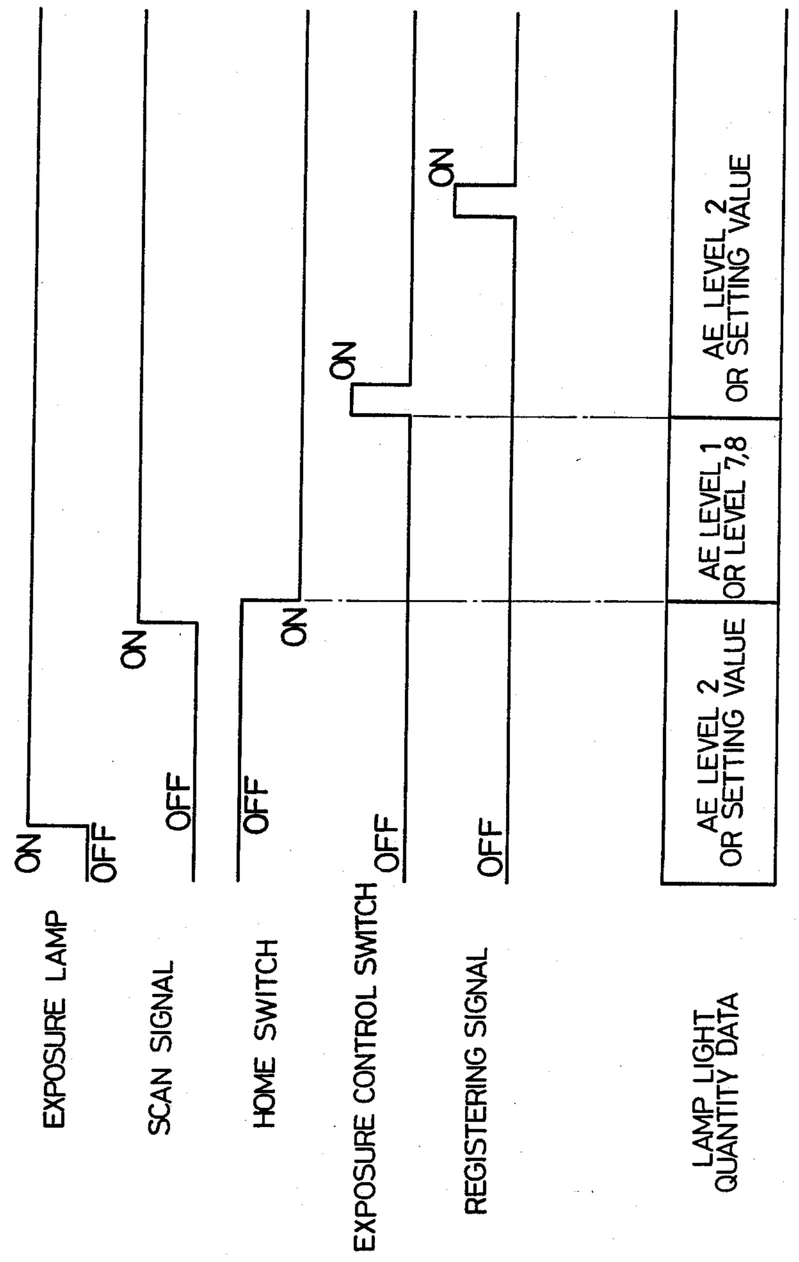
FIG. 5 is a timing chart illustrating the illumination adjusting timing of the exposure lamp.

FIG. 5 is a timing chart illustrating the illumination adjusting timing of the exposure lamp, wherein lighting of the lamp, the scan start, the illumination adjusting timing and the like are shown.

Next, the exposure control operation during the copying operation will be described by referring to FIG. 2, FIG. 3 and FIG. 5.

In the automatic exposure control, the original document is first put on the original document holding glass 3 of the copying machine, and after the set of the AE mode the print key is pushed, thereby the copying operation is started. The output port PT0 of the CPU 20 outputs the lamp lighting signal, the output ports PT1 to PT5 output the signal of level 2 of the normal reference level as the light quantity data, and the output port PT6 outputs the AE mode signal.

After the lapse of the warming up time of lightened exposure lamp the scan start signal is outputted from the output port PT7, thereby the scan is started. The exposure in this state is controlled by using the level 2 with the normal reference level. However, if the home switch for detecting the starting of scan is turned on, the CPU 20 outputs the signal of the AE level 1 with the increased reference level into the illumination adjusting circuit 21, thereby the white member W of the original document holding glass is scanned with the increased light quantity.

When the scan line P of the first slider 9 of the scanning optical system attains to the border Q between the white member W of the original document holding glass and the original document surface OP, the exposure control switch 15 is turned on and a pulse signal is outputted to the CPU 20.

The CPU 20, when it receives the pulse signal, outputs the signal of the AE level 2 with the normal reference level to the illumination adjusting circuit 21 which sets the optimum exposure based on the reference level and the brightness signal detected by the AE sensor thereby the original document surface OP is scanned with adequate illumination.

In the manual mode where the exposure value is set by manual operation, the exposure value is key inputted from the operation panel of the copying machine before the scan start. The original document is put on the original document holding glass 3 and the print key is pushed, thereby the copying operation is started.

The output port PT0 of the CPU 20 outputs the lamp lighting signal, the output ports PT1 to PT5 output the setting light quantity data, and the output port PT6 outputs the manual mode signal.

After the lapse of the warming up time of the lightened exposure lamp the scan start signal is outputted from the output port PT7, thereby the scan is started. The exposure value in this state is set according to the set value set by manual operation. However, if the home switch for detecting the start of scanning is turned on, the output ports PT1 to PT5 of the CPU 20 output the light quantity signal corresponding to the exposure level 7 or 8 irrespective of the set exposure value, thereby the white member W of the original document holding glass is scanned with the increased light quantity.

When the scan line P of the first slider 9 of the scanning optical system attains to the border between the white member W of the original document holding glass and the original document surface OP, the exposure control switch 15 is turned on and a pulse signal is outputted to the CPU 20.

The CPU 20, when is receives the pulse signal, outputs the light quantity data signal to make the exposure value its set value, thereby the original document surface OP is scanned at the set light quantity.

Next, in the case of the variable magnification copying machine, countermeasure to the width variation of the erase portion will be described.

In the white member of a definite width provided on the original document holding glass surface from the scan start position in the scanning direction, while the copy is performed by the different magnification from the original document, of course, the width of erase portion is varied depending on the magnification. Particularly in the case of the reduced magnification, the erase portion of the top end of the electrostatic latent image formed on the photosensitive member is narrowed, thereby the effect of preventing the toner adhesion to the top end of the copy sheet is liable to become insufficient.

As the countermeasure to this state, the copying paper feed timing for transferring the electrostatic latent image on the photosensitive member to the copying paper may be made early. More specifically, the registering signal for the timing roller operation to feed the copying paper within the copying machine towards the photosensitive member may be outputted early by the paper conveying time corresponding to length of l×(1−magnification), where the length l is the erase width in the equal magnification copy.

When a binding margin preparing mode is selected a the copying mode, the registering signal is outputted early by time corresponding to a binding margin. Since the erase portion is formed on the copy sheet as already described, the binding margin may be decreased by the width of the erase portion. That is, when the binding margin width is made n and the erase width is made l, the registering signal may be outputted earlier by the paper conveying time corresponding to the length of n−l×(1−magnification) than the output time of the registering signal in the usual binding margin preparing operation.

Next, signal processing within the CPU regarding the exposure control of the invention will be described.

Figure 6:
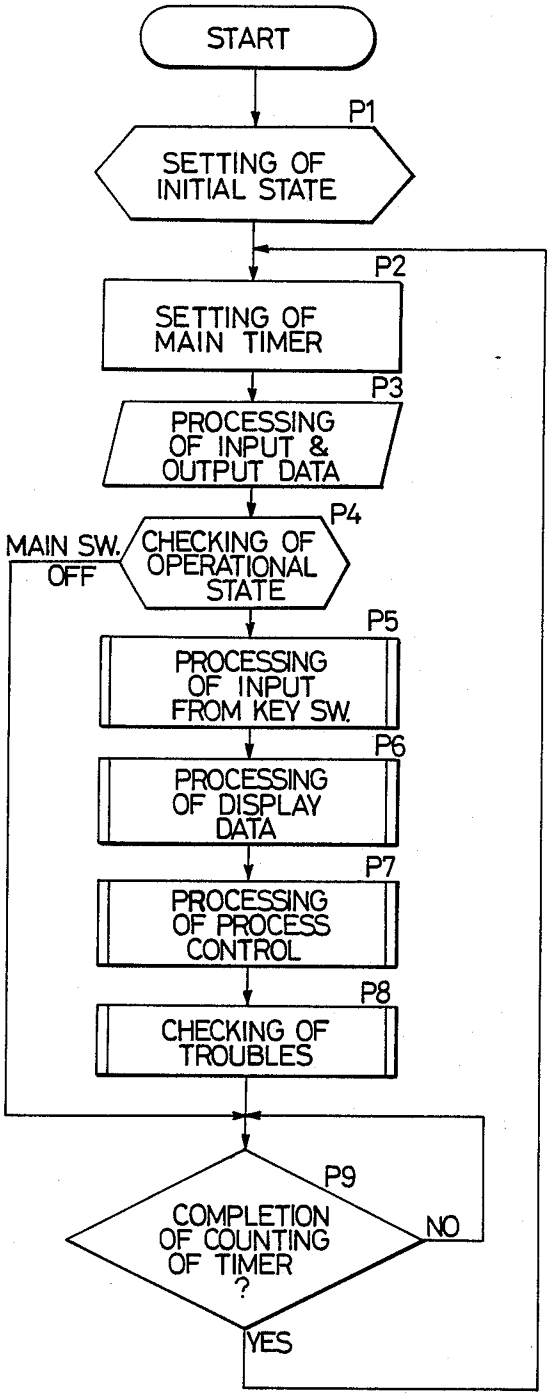
FIGS. 6 to 11 are flow charts of the signal processing.

FIGS. 6 through 11 are flow charts of the signal processing, and FIG. 6 shows an outline of the whole processing.

In the flow chart of FIG. 6, upon the turning on of the power source the initial state of the CPU is set in step P1, thereby initialization of any control object is performed. In step P2, the main timer to be used in the control of routine repetition is set and start.

In step P3 processing of input data and output data is performed, and in step P4 the operational state of the copying machine is checked. If the main switch is at an OFF state, subsequent steps are omitted and the program proceeds to step P9. If the main switch is at an ON state, the program proceeds to step P5 and so forth.

In step P5, processing of input signals from copying number setting keys and other operation key switches is performed. If the print key is at ON state, the copy flag C is set to 1. In step P6, processing of the operation panel display data is performed.

In step P7, a process control for copying is performed. This processing will be further described in detail by referring to FIG. 7 and so forth. In step P8, detection processing of various troubles is performed. In step P9, the counting of the main timer is checked, and if the counting of the timer is completed, the program proceeds to step P2 and advances to the next cycle.

Figure 7:
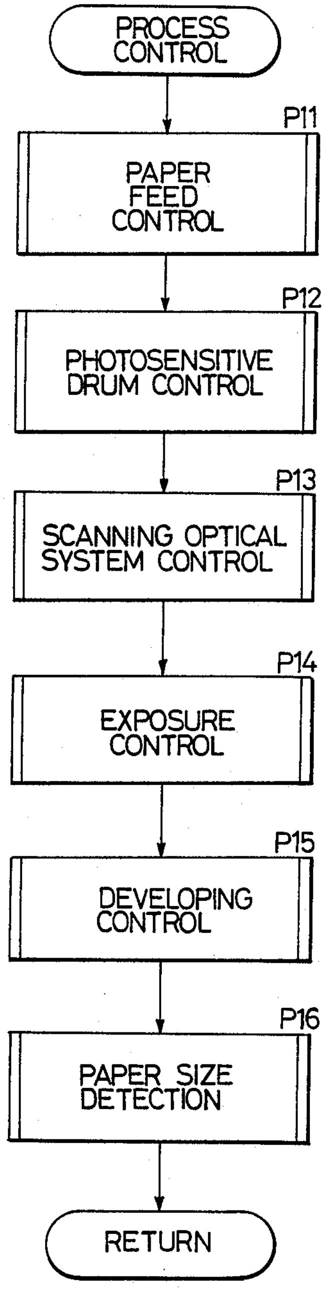

FIG. 7 is a flow chart of process control. As shown in step P11 through step P16, paper feed control, photosensitive drum control, scanning optical system control, exposure control, developing control and paper size detection are performed in sequence.

Among the above-mentioned process control, only a part concerning the invention will be further described in detail.

Figure 8:
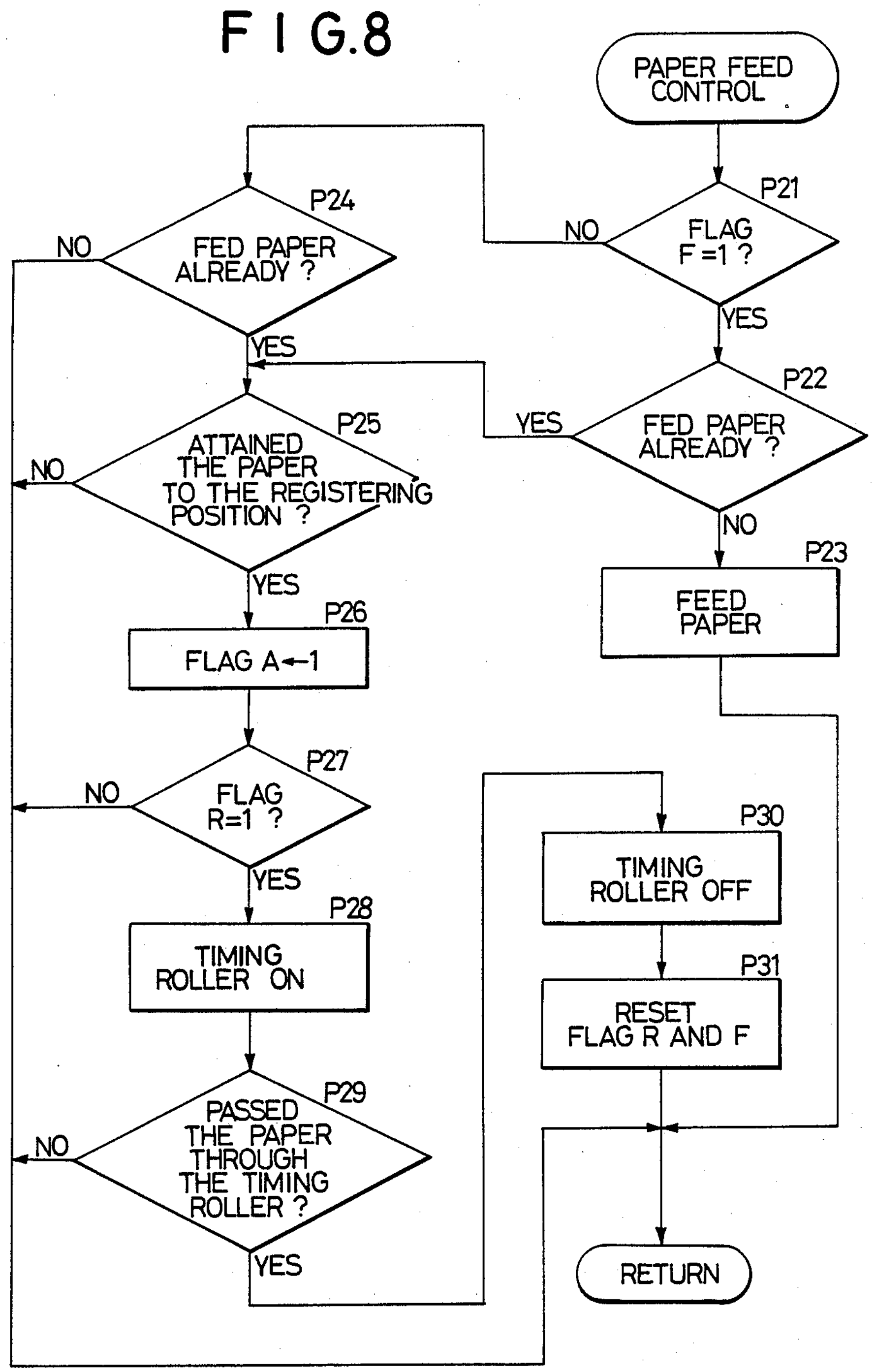

First, the paper feed control routine will be described by referring to the flow chart shown in FIG. 8.

In step P5 of the flow chart of FIG. 6, if the print key is turned on, a copy flag C is set to 1. When the flag C is 1, the paper feed allowing flag F is set to 1 in the photosensitive drum control routine as hereinafter described. The flag F is checked in step P21, and if the flag F is 1, the program proceeds to step P22 and the checks whether the copying paper was already fed or not. If the paper is not fed, the paper feed command is issued to feed the paper (step P23) and program returns to the main routine. If the paper feed allowing flag F≠1 in step P21, the program proceeds to step P24 and checks whether the paper was already fed or not. If the paper was not fed, program returns to the main routine. If the paper was fed in step P24 or in step P22, the program proceeds to step P25 and checks whether the copying paper is in the registering position or no...

If the copying paper is in the registering position, a flag A is set to 1 (step P26). If the copying paper is not in the registering position, the program returns to the main routine.

After the starting of a scanning operation by the optical system, when the registering signal is issued from the CPU after lapse of the predetermined time (refer to FIG. 5), a flag R to operate the timing roller is set to 1 in the exposure control routine as hereinafter described, but the flag R is checked in step P27 of this paper feeding control routine. Now the program checks the flag R and if the flag R=1, the timing roller is operated (step P28). If flag R≠1, the program returns to the main routine. The program proceeds to step P29 and checks whether the copying paper passed through the timing roller or not (step P29). If the copying paper did not pass, the program returns to the main routine. If the copying paper passed, the program stops the timing roller and resets the flag R and flag F (steps P30 add P31) and returns to the main routine.

Figure 9:
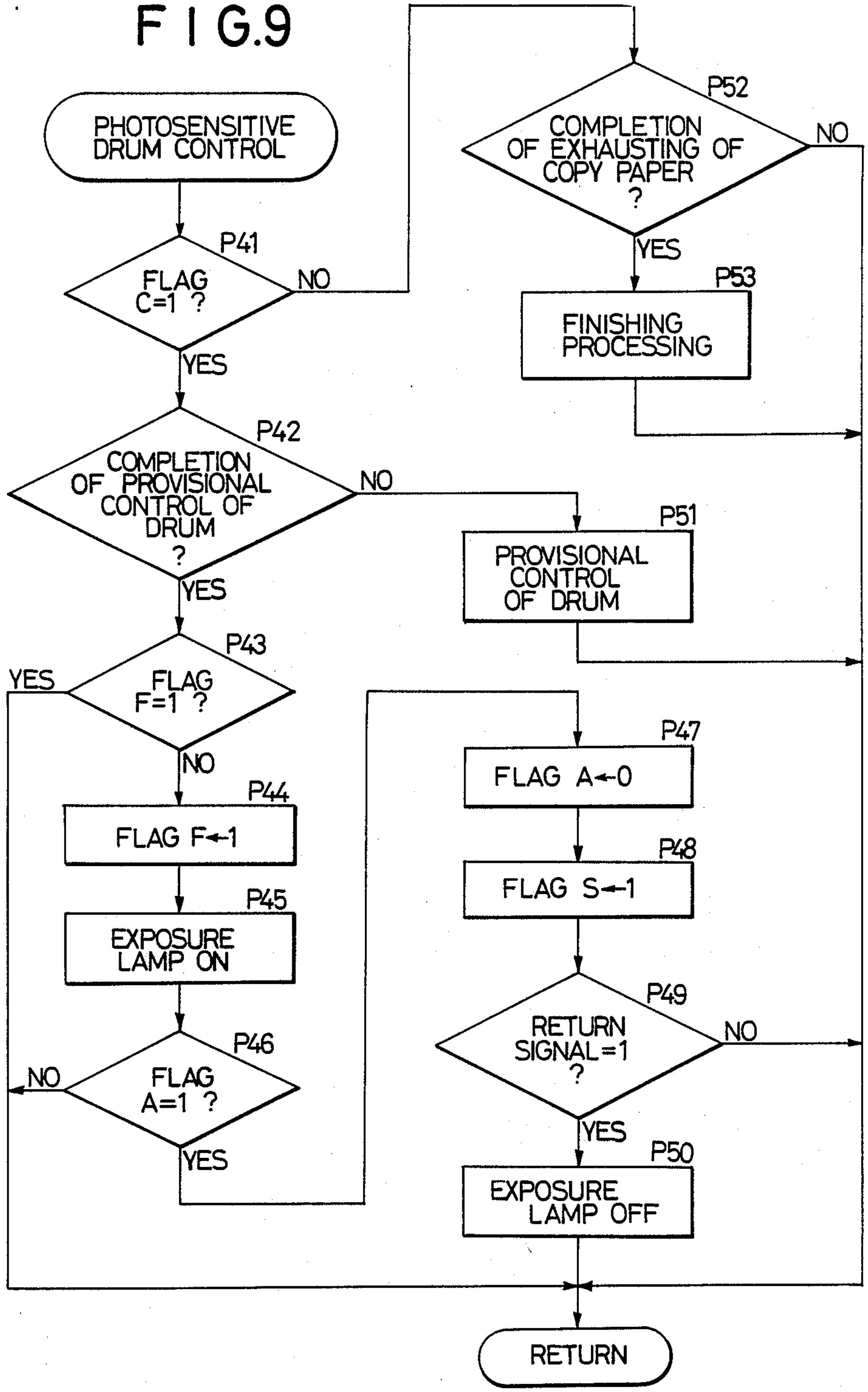

The photosensitive drum control routine will be described by referring to the flow chart shown in FIG. 9.

First, in step P41, the program checks the copy flag C which is set by the turn on of print key. If the flag C=1, the program checks the completion of the provisional control of the photosensitive drum, i.e., completion of charging, erasing or the like (step P42). If the provisional control is not completed, the program proceeds to step P51, conducts the provisional control and returns to the main routine. If the provisional control has been completed in step P42, the program proceeds to step P43 and checks the paper feeding allowing flag F. If the flag F=1, the program returns to the main routine to conduct the paper feed control routine. If the flag F≠1, the flag F is set to 1 and the exposure lamp lighting signal is issued (steps P44 and P45). The program proceeds to step P46 and checks the flag A which shows that the copying paper has attained to the registering position (step P46). If the flag A=1, the program resets the flag A and sets flag S which allows the start of a scanning operation (steps P47 and P48). The program proceeds to step P49 and checks the return signal which represents the returning of the scanning optical system. If the return signal is 1, program turns off the exposure lamp (step P50) and returns to the main routine.

In step P41, if the copy flag C is not 1, the program proceeds to step P52 and checks the completion of the exhausting of the copying paper. If the exhausting of the copying paper is completed, since it means the completion of the copying operation the necessary finishing processing is performed (step P53 and the program returns to the main routine.

Figure 10:
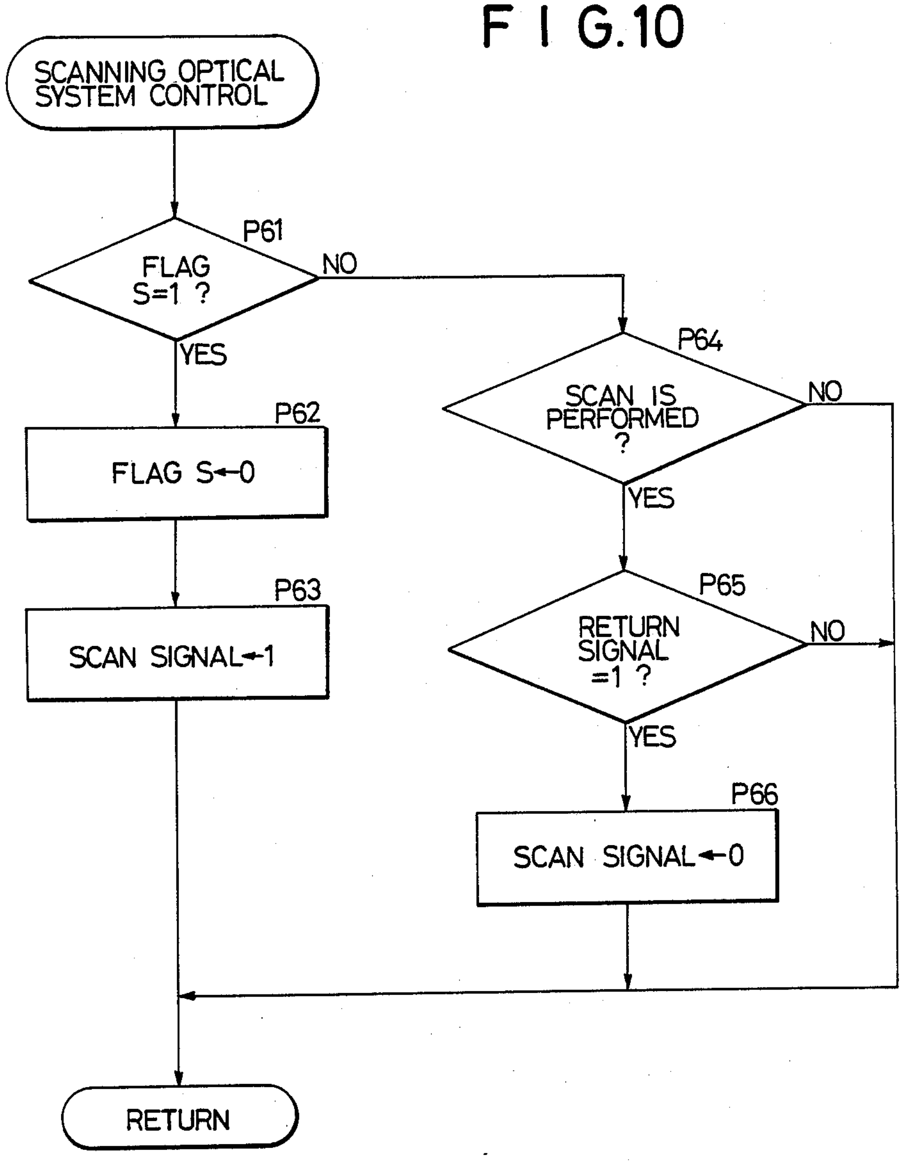

The scanning optical system control routine will now be described by referring to the flow chart shown in FIG. 10. First, the program checks the flag S which is set at step P48 of the photosensitive drum control routine for allowing the start of scanning (step P61). If the flag S=1, the flag S is reset and scanning signal is set to 1 (steps P62 and P63). The scan start signal is issued from CPU to the scanning optical system to start the scanning operation. If the flag S is not 1, the program proceeds to step P64 and checks the home switch as to whether the scan is performed or not. If the scan is not performed, the program returns to the main routine. If the scan is performed, the program proceeds to step P65 and checks the issue of the return signal which is to be issued from CPU when the scanning operation is completed. If the return signal is not issued, the program returns to the main routine. If the return signal is issued, the program resets the scan signal to 0 (step P66) and returns to the main routine.

Figure 11:
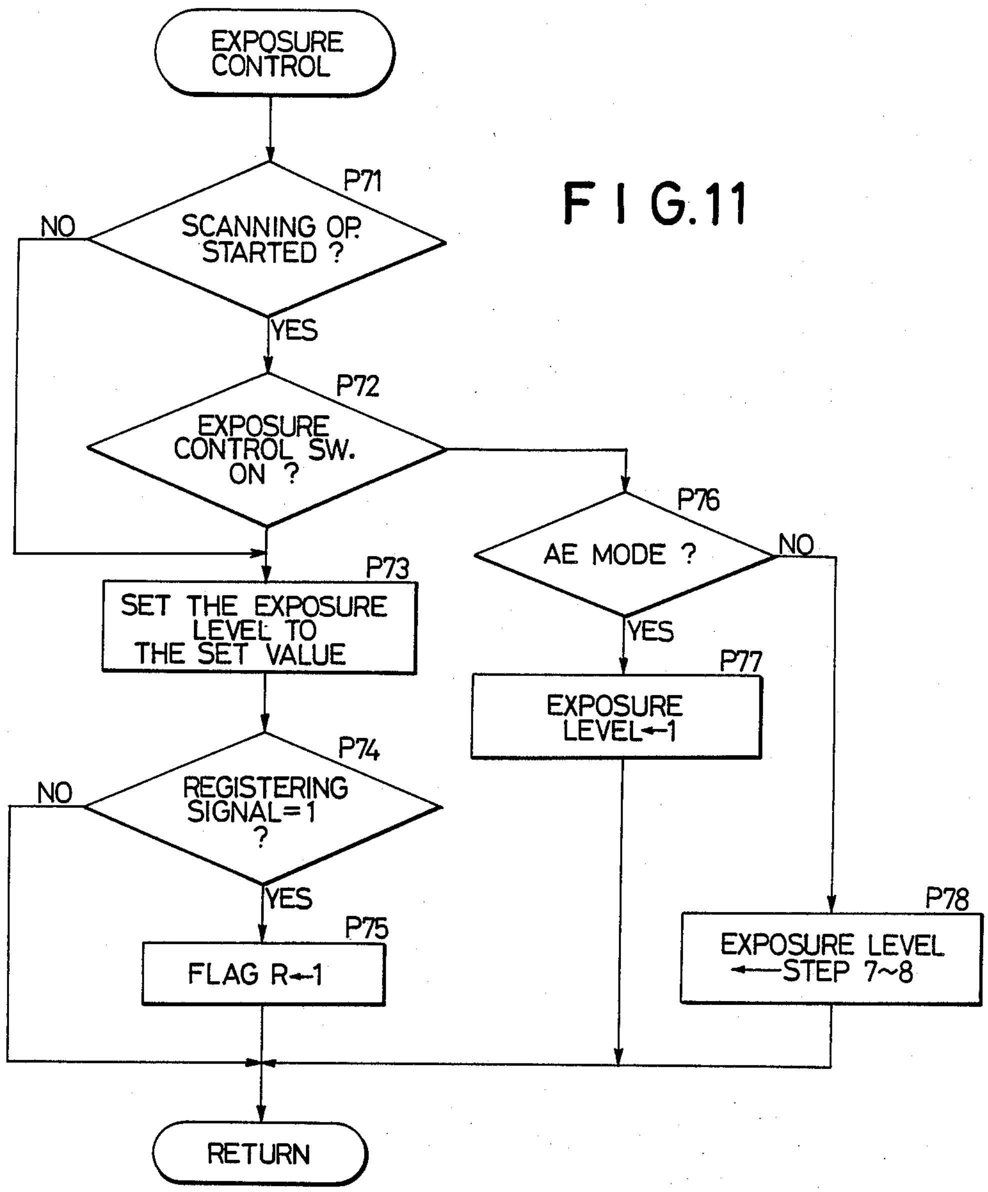

Finally, the exposure control routine will be described by referring to the flow chart shown in FIG. 11.

First, in step P71, the program checks the start of the scanning operation by the scanning optical system. If the scanning operation is started, the program checks whether the exposure control switch is turned on or not (step P72). If the scanning operation is not yet started or the scanning operation is started and the exposure control switch is turned on, at the same time, the program proceeds to step P73 and sets the exposure level to the set value and in case of AE mode, sets the exposure level to the level 2. The program proceeds to step P74 and checks whether the registering signal is issued from the CPU or not. If the registering signal is 1, i.e., it is issued, the program sets the flag R to 1 (step P75) and returns to the main routine. If the registering signal is not issued, the program returns to the main routine. If the exposure control switch is not turned on in step P72, the program proceeds to step P76 and checks whether the set mode is AE mode or not. If it is the AE mode, the exposure level is set to the level 1 (step P77). If it is not the AE mode, since it is the manual mode, the exposure level is set to exposure stp 7 or 8 (step P78), and the program returns to the main routine.

According to the invention as above described, even if there is a difference in the reflectance between the white member provided on end portion of the original document holding surface and the original document surface and insufficiency of the reflection light quantity on the border between both surfaces, the exposure is supplied so as to compensate for the insufficiency whereby the fog is not produced on the photosensitive member. Consequently, toners do not adhere to the top end of the copying paper, and the copying paper is not soiled during the fixing process or the copying paper is not struck to the fixing roll.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An exposure control device for use in a copying machine having a transparent platen to hold an original document thereon, a lamp to illuminate the original document, a scanning member to scan an image of the original document, and an optical system to project the scanned image onto a photosensitive member, said exposure control device comprising:

(a) a while member provided on the transparent platen at an upstream side in the scanning direction from the original document holding surface, said white member is provided so that a part of the white member is overlapped with a top end portion of the original document;

(b) means for setting the lamp light quantity to form a suitable image;

(c) means for generating a signal at the time when the scanning member scans the border between the white member on the platen and the original document;

(d) control means for controlling electric power to be supplied to the lamp, whereby the control means effects the control so that predetermined electric power is supplied to the lamp while the scanning member moves from a scan position to the border, and after the signal is generated the electric power is supplied to the lamp in response to the lamp light quantity setting means, wherein a predetermined electric power is sufficient for the image of the white member on the platen not to produce fog.

2. An exposure control device as claimed in claim 1, wherein the lamp light quantity setting means comprises a light receiving element arranged in the light path for image projection, and means for determining suitable light quantity of the lamp by comparison of an output of the light receiving element with a reference value, and said control means supplies the first reference value to the light quantity determining means while the scanning member moves from the scan start position to the border, and supplies the second reference value thereto after the signal is generated, said first reference value providing a lamp light quantity larger than said second reference value with respect to the same light receiving element output.

3. An exposure control device as claimed in 1, wherein said lamp light quantity setting means includes an input device which sets the lamp light quantity to be used by a manual operation, and said control means supplies definite electric power to the lamp while the scanning member moves from the scan start position to the border, and supplies electric power corresponding to inputted value from the input device to the lamp after the signal is generated.

4. In an improved copying machine having a support member to hold an original document thereon, illumination means to illuminate the original document, a scanning member to scan the original document, an optical system to project the scanned image of the original document onto a recording member and means for providing copy paper to the image, the improvement comprising:

an edge member provided on the support member to supplement the border of the original document to prevent any edge fogging of the recorded image on the copy paper;

means for monitoring the coincidence of the scanning member scan travel with the interface of the edge member and the original document and providing a signal, and control means responsive to the signal to vary the intensity of the illumination means from an intensity suitable for the edge member prior to the signal to an intensity suitable for the original document to thereby prevent any edge fogging on the copy paper.

5. An exposure control device for use in a copying machine having a transparent platen to hold an original document thereon, a lamp to illuminate the original document, a scanning member to scan an image of the original document, an optical system to project the scanned image onto a photosensitive member and means for supplying and fixing the scanned image on the copy paper, said exposure control device comprising:

a white member provided on an edge of the transparent platen;

means for setting the intensity of the lamp light to form a suitable image including: a light receiving element arranged in the light path for image projection;

means for controlling a suitable light quantity for the lamp by comparison of an output of the light receiving element with a reference value;

means for supplying an initial first reference value to the controlling means at the start of a scan cycle;

means for monitoring the coincidence of the scanning member scan travel with the interface of the edge of the white member and the original document and providing a signal, and means for supplying a second reference value to the controlling means after the signal is generated by the monitoring means, whereby the controlling means controls the intensity of the light emitted by the lamp to prevent any edge discoloration of the image on the copy paper.

* * * * *